(12) United States Patent
Gray

(10) Patent No.: US 7,540,137 B2
(45) Date of Patent: Jun. 2, 2009

(54) SELF PROPELLED ROBOTIC FRESH PICKER

(76) Inventor: George Gray, 2445 Erin Way, Eugene, OR (US) 97408

( * ) Notice: Subject to any disclaimer, the term of this patent is extended or adjusted under 35 U.S.C. 154(b) by 0 days.

(21) Appl. No.: 11/777,793

(22) Filed: Jul. 13, 2007

(65) Prior Publication Data
US 2008/0010961 A1   Jan. 17, 2008

Related U.S. Application Data

(60) Provisional application No. 60/807,213, filed on Jul. 13, 2006.

(51) Int. Cl.
*A01D 46/00* (2006.01)
(52) U.S. Cl. ...................... 56/328.1; 56/13.1
(58) Field of Classification Search .............. 56/10.2 A, 56/328.1, 329, 332–340, 12.8, 12.9, 13.1, 56/13.2
See application file for complete search history.

(56) References Cited

U.S. PATENT DOCUMENTS

| | | | | |
|---|---|---|---|---|
| 2,968,907 | A * | 1/1961 | Bernheim et al. ............. 56/332 |
| 3,200,575 | A | 8/1965 | Hurst |
| 3,460,330 | A * | 8/1969 | Black, Jr. .................... 56/328.1 |
| 3,606,750 | A * | 9/1971 | Walker et al. ................. 56/331 |
| 4,482,960 | A | 11/1984 | Pryor |
| 4,519,193 | A * | 5/1985 | Yoshida et al. ............. 56/328.1 |
| 4,532,757 | A | 8/1985 | Tutle |
| 4,663,925 | A | 5/1987 | Terada |
| 4,718,223 | A | 1/1988 | Suzuki et al. |
| 4,975,016 | A | 12/1990 | Pellenc et al. |
| 5,005,347 | A | 4/1991 | Kedem et al. |
| 5,421,146 | A | 6/1995 | Visser |
| 5,428,947 | A | 7/1995 | Visser |
| 5,471,827 | A | 12/1995 | Janssen et al. |
| 5,636,710 | A * | 6/1997 | Ables et al. .................... 186/41 |
| 5,956,933 | A | 9/1999 | Heard |
| 6,442,920 | B1 | 9/2002 | Peterson et al. |
| 2003/0070409 | A1 | 4/2003 | Adams |
| 2005/0126144 | A1 | 6/2005 | Koselka et al. |

OTHER PUBLICATIONS

International Search Report in Corresponding International Application No. PCT/US2007/073492.

* cited by examiner

*Primary Examiner*—Alicia M Torres
(74) *Attorney, Agent, or Firm*—Robert L. Shaver; Dykas, Shaver & Nipper, LLP

(57) ABSTRACT

An automated fruit harvester which includes sensors and robotic arms which position themselves adjacent to a fruit to be harvested. A fruit transport head secures the fruit, cuts the stem, and transports the fruit within the hollow arm, to deposit the fruit in a collection bin.

16 Claims, 5 Drawing Sheets

SELF PROPELLED ROBOTIC FRESH PICKER

CROSS-REFERENCE TO RELATED APPLICATIONS

This application claims the priority date of the provisional application entitled SELF PROPELLED ROBOTIC FRESH FRUIT PICKER filed by George Gray on Jul. 13, 2006 with application Ser. No. 60/807,213.

FIELD OF THE INVENTION

The invention is a mechanical fruit harvesting machine, and more particularly, a fruit harvesting machine which picks tree fruits and collects the fruit in a central location.

BACKGROUND OF THE INVENTION

Many tree fruits are delicate in nature and sensitive to bruising during the harvesting process. In particular, apples are quite sensitive to bruising, and any bruising will cause an apple to be classified as a "juicer" rather than as a premium quality dessert apple. The price that the grower receives for "juicers" or other lower grades of apples is much reduced from that which he receives for dessert grade apples. The class of "juicers" includes apples which are made into apple juice, as well as apples which are sliced and dehydrated, canned or otherwise processed. Dessert grade apples are sold to consumers for consumption as fresh fruit.

Other fruits have similar problems with bruising during harvesting, and therefore great care is taken to harvest them in a manner that does not bruise them, and thus detract from their storage life or quality.

Most tree fruits have traditionally been picked by hand, with exceptions being almonds, walnuts, pecans and other nuts. Apples, oranges, pears, plums, cherries, peaches, apricots, nectarines and other similar fruit all must be picked by hand because a mechanical process has not been devised which is economical to use and can harvest the delicate fruit without causing bruising.

What is needed is a fruit harvesting machine which can harvest delicate fruits without causing bruising to the fruit, and which can collect the fruit in a central location for transport within the harvesting system, and which utilizes sensors to locate fruit and position the mechanical harvester for harvesting the fruit.

SUMMARY OF THE INVENTION

These and other goals are accomplished by the automated fruit harvesting machine of the invention. The embodiment that is described will be the embodiment which is particularly adapted to harvest tree fruits, but it is to be understood that other embodiments encompassed by the claims of the patent are also considered to be within the scope of the invention.

The harvester includes a base unit which is self propelled and has a propulsion assembly, a computational assembly, and a functional connection to a fruit storage container. The harvester also has a number of arm bases to which are attached a number of jointed arms. The harvester may optionally include a belt for moving the harvested fruit from the harvesting device into a fruit storage bin or a truck. The propulsion assembly can take a number of configurations such as three wheels, four wheels, or a configuration with two tracks for propulsion like a tracked vehicle.

The computational assembly includes storage media for storing programs, input devices, such as keyboards, joy sticks, cameras and mouse, and output devices such as a view screen and printer, device controls and computational means for performing calculations related to the tasks of the harvester.

The functional connection of the harvester to the fruit storage bin can take a number of configurations such as a connection to a fruit bin which is towed behind the propulsion unit, one in which the fruit bin is separate from the harvester and placed adjacent to the harvester, or one in which the fruit storage bin or shipping box is incorporated into the harvester and is carried along with the harvester as it moves from place to place. A configuration with a conveyor belt is also an option.

The arms are jointed and attached to the arm bases on the base unit. Each arm is made up of a number of rigid tubes which are curved and attached to an adjacent tube. The tubes are attached end to end and in each of their connections the tubes may be rotated in relation to each other. By combining the curves of the various tube sections of each arm, the end of each arm can be brought to position adjacent to any particular fruit which is targeted for harvesting. The tubes can be rotated in relation to each other by a number of means such as gears with motors on the tube joints, or by hydraulic or electric means. Each of the joints between the tubes thus has a tube rotation assembly which controls the rotation and the positioning of the tubes.

The device also has a number of sensors. The sensors can take a number of different forms and sense different wavelengths or different colors. The visible light spectrum may serve as basis for the sensor, or artificial light or ultra violet light could also be utilized. Depending on the type of sensors selected, the device can work during the nighttime hours and/or during the day. The sensors can be located at the end of the arms, or the sensors can be located on or adjacent to the harvester base unit, or both. Sensors can be located on the base unit to map out the location and route for moving an arm to a target fruit, and other sensors on the tips of the arms themselves could be used for the final positioning and movement of the arm to harvest the fruit. Inputs from the sensors will be utilized by the computational assembly to identify target fruit, to calculate a path for one of the arms to reach the fruit, and to direct the two rotational assemblies to make the joint alignments move the arm into position adjacent or over the target fruit. The sensors can be configured to allow the harvesting unit to harvest fruit by color, so that fruit which are of a color that indicated immaturity would not be harvested, but fruits which are of a color that indicated maturity and suitability for picking are harvested. For those fruits which are not harvested, a second or even a third pass of the device would be required to harvest them when they are sufficiently mature for harvest. The device also includes a fruit transport head which is located internally in the arm and is moveable from the device body to a distal end of each arm. The fruit transport head is configured to be positioned around the selected fruit by the positioning movements of the arm. The fruit transport head can move from a neutral position to a gripping position around the selected fruit, which would be by movement of a padded or soft surface cuff around the fruit to be selected. The movement of the cuff can be by inflation of a flexible bladder, or it can be a mechanical movement which moves the cuff into gentle contact with the selected fruit. The fruit transport head thus engages the selected fruit around its circumference, and retains contact with the fruit until the fruit is deposited into the fruit storage bin or tray.

Certain types of fruits may be removed from the fruit transport head by merely securing the fruit and pulling the fruit away from the tree. Other fruits such as apples may require a more complex manipulation to remove from the tree, because pulling an apple from the tree can pull the stem out of the apple, or pull fruit spurs off the tree. The goal with picking an apple is to leave at least a portion of the stem remaining in the apple and to not pull any fruit spurs off of the tree. This is accomplished either by cutting the stem of the fruit, or by breaking the stem off of the fruit spur at the abscission layer, which is a layer of corky tissue between the base of the stem and the fruit spur. In the case of an apple harvester configuration, a fruit stem separator is part of the machine and serves to disengage the fruit from the tree without pulling the stem from the apple and without pulling the fruit spur from the tree.

The fruit stem separator may be a knife or scissor type cutter or may be a finger like device which applies pressure at the abscission layer in simulation of the way a human picker removes fruit from an apple tree or a highly controlled laser beam, water or air jet stream.

Once the apple is removed from the tree it is still secured by the fruit transport head. The fruit transport head is configured to pass down the internal cylindrical chamber formed inside the arms of the harvester. As the fruit transport head passes through the center of the arms of the harvester it reaches a drop point where the gripping position is relaxed and the fruit transport head moves to a neutral position. Once released the apple falls by gravity not more than ¾ the diameter of the fruit into the fruit bin or into a conveyor which takes the apple to the fruit bin. Once the fruit is released, the fruit transport head is propelled back up the interior chamber of the arm and positioned itself in the tip of the arm until it is ready to be used again to secure and pick a fruit. The fruit transport head can be traveling up or down the internal chamber of the arm while the arm is being repositioned to pick the next fruit. The travel of the fruit transport head can be in a manner similar to the transport mechanism of bank remote teller tube stations and transport shuttles. The fruit transport head can be propelled by differences in air pressure, which would move the fruit picker back and forth in the tube. The arm of the harvesting device can also be configured with a Y assembly, which allows one arm to have the use of two or more fruit transport heads. While a fruit transport head is traveling down the arm toward the fruit collection point, as soon as the fruit transport head clears the one-way part of the tube, another fruit transport head can be sent up the arm to prepare for picking the next fruit. While the fruit transport heads are traveling back and forth inside the hollow arm pieces, the arms can be positioning for the next fruit to be picked, so that a more rapid pace of fruit picking is achieved.

The fruit stem separator may be a knife or scissors type cutter, or may be a finger like device which applies pressure at the abscission layer in simulation of the way a human picker removes fruit from an apple tree.

Once the apple is removed from the tree it is still secured by the fruit transport head. The fruit transport head is configured to pass down the internal cylindrical chamber formed inside the arms of the harvester. As the fruit transport head passes through the center of the arms of the harvester it reaches a drop point where the gripping position is relaxed and the fruit transport head moves to a neutral position, allowing the fruit to fall a short distance to the fruit bin.

One mode of picking fruit is to place the vehicle body centrally between four fruit trees. From this position the harvester can scan for fruit on the adjacent 90 degree section of each of the four fruit trees, calculate positioning solutions for each of the fruits, and move the arms into position to pick the fruit on the interior section of each tree. In this manner the fruit harvester can move from point-to-point and each arm can pick one quarter of each tree at a time.

Because of the ability of the fruit harvester to utilize a number of sensor modes, it is very possible for the fruit harvester to move within an orchard, position itself or be positioned by an operator, and pick trees during the day time or at night, 24 hours a day. The computational component of the fruit harvester can utilize the GPS system to know its location and to orient itself within an orchard so that when the end of the row is reached, it can easily pivot around the end of the row and start up the next row or move to a different part of the orchard that has been indicated as ready for picking. GPS data would be combined with sensor data on tree location to enable the picker to know where it is in the orchard, and proceed to pick the fruit of the orchard.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
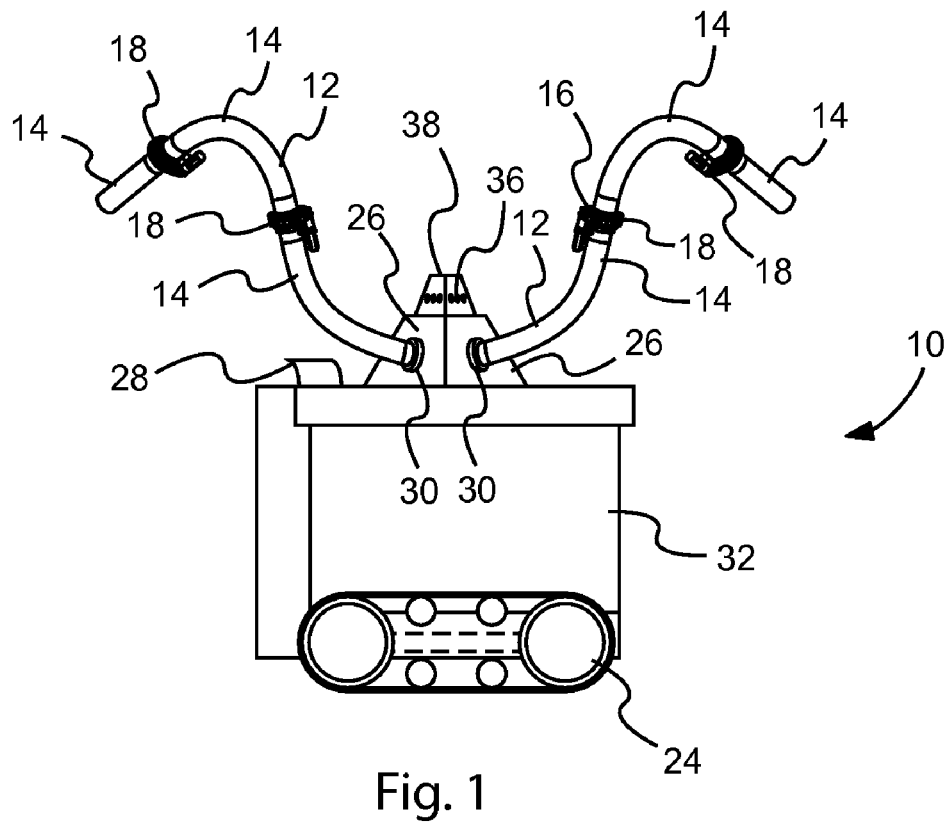
FIG. 1 is a side view of an embodiment of the harvesting machine of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

FIGS. 1-7 show one or more preferred embodiments of the present invention. FIG. 1 shows a version of the harvesting machine 10 of the invention. This embodiment includes a number of jointed arms 12 with each jointed arm 12 comprised of a number of rigid arm tubes 14. Shown is a unit with four arms, but units with more or fewer arms are also within the scope of the invention. The rigid arm tubes 14 are joined to each other at a joint 16 at which point is located a tube rotation assembly 18. The embodiment shown in FIG. 1 includes a computational assembly 28 which is attached to a harvester base unit 26. The propulsion assembly 24 is shown, which in this case is a tracked assembly. Each of the arms 12 are attached to the harvester base unit 26 with an arm base 30, which like the tube rotation assemblies 18, have the capability of causing rotation of the rigid arm tube attached to the arm base 30. This configuration of the device is built around a fruit bin 32 which would be filled with fruit being harvested, then would be replaced with an empty bin for further filling. Other configurations would include a towed bin, or a conveyor belt to a nearby bin or truck. An optional configuration of the harvester includes a system by which the fruit transport heads move over trays to set an apple in a chosen position on the tray, including the capability to sort the fruit by size and color and grade. In this type of device, the bin would not be present, or the bin would be the outer container for trays in layers.

Figure 2:
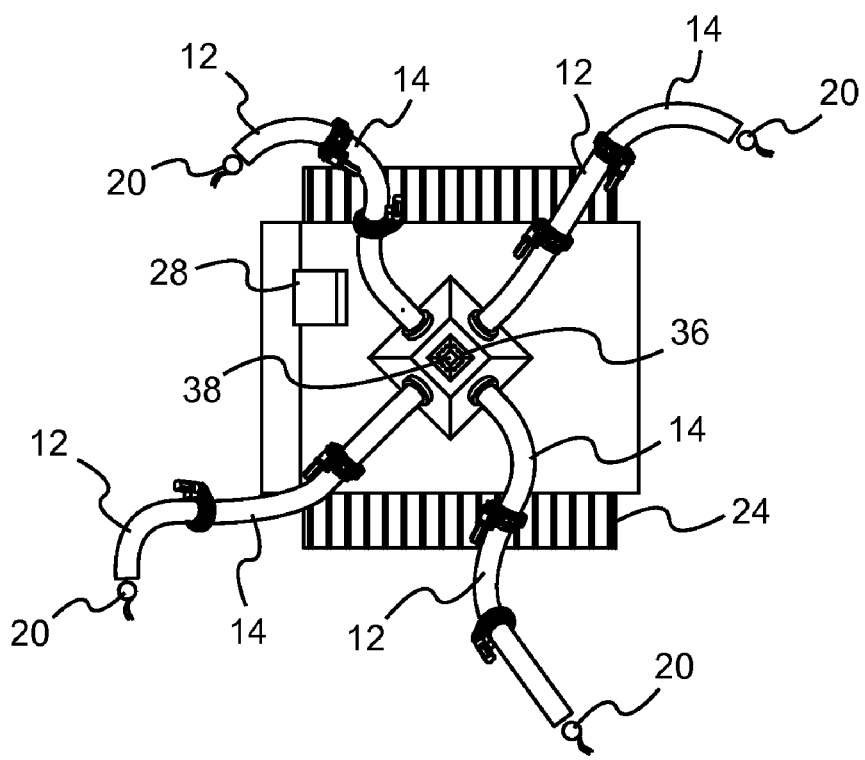
FIG. 2 is a top view of an embodiment of the harvesting machine of the invention.

FIG. 2 shows a top view of the same embodiment of the device, with the same components as are shown in FIG. 1. This configuration of the device is particularly well suited to be placed in a row between four fruit trees so that each of the arms 12 would have access to approximately one fourth of an adjacent fruit tree. Once each of those sectors had been harvested, the device would move to a position between four other fruit trees and continue harvesting. Also shown in FIGS. 1 and 2 are sensors 36, which in this case are located in a sensor head 38. The sensors are a part of the system for locating fruit and directing the harvesting of the fruit. The information from the sensors is analyzed in software in the computational assembly 28. The information derived from the sensors is analyzed and subjected to pattern recognition so that the xyz location of fruit is determined. With the information about the accessible fruit being recorded, the computational assembly then optimizes the picking of the fruit, and optimizes the recovery sequence of the arms.

Figure 3:
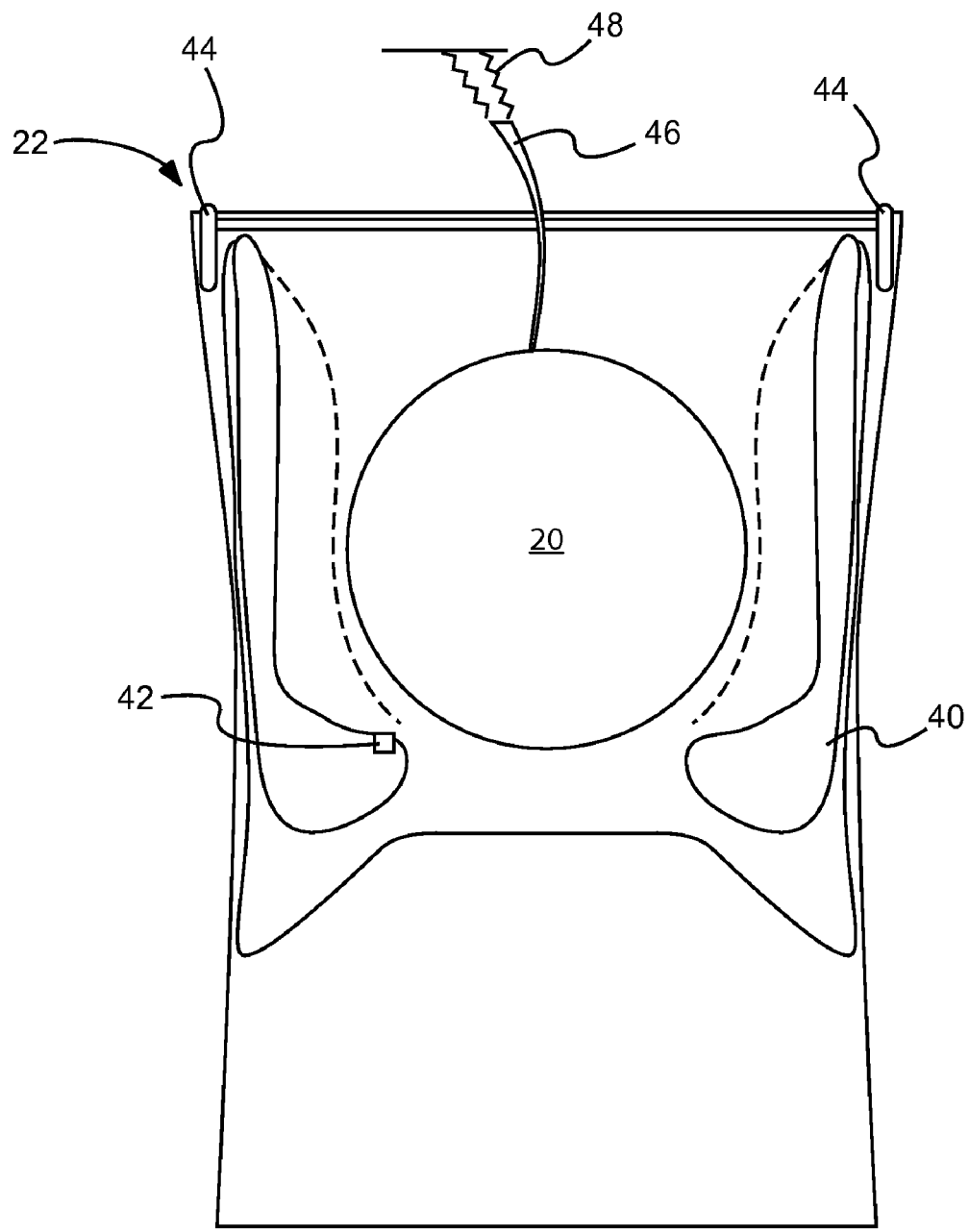
FIG. 3 is a side cross sectional view of the fruit transport head of the invention.

FIG. 3 shows the fruit transport head 22 of the invention. This view includes a fruit 20 around which the fruit transport head 22 has been positioned for transport inside the rigid arm tubes 14 of a jointed arm 12. The fruit transport head 22 includes a cuff 40, which preferably is inflatable. A fruit sensor 42 within the fruit transport head 22 senses the presence of the fruit 20 by contact. When the fruit 20 contacts the fruit sensor 42, the cuff 40 inflates to grip the fruit 20 and secure it within the fruit transport head 22. Once secured, a fruit stem separator 44 is activated which cuts off the stem 46 of the fruit without damaging the fruit spur 48. The fruit stem separator 44 shown in FIG. 3 is a mechanical device comprised of blades which close in an iris fashion to cut the stem 46. Other fruit stem separators can also include mechanical knife, a laser located in the fruit transport head, or device which uses a high pressure water jet to cut the stem 46.

Figure 4:
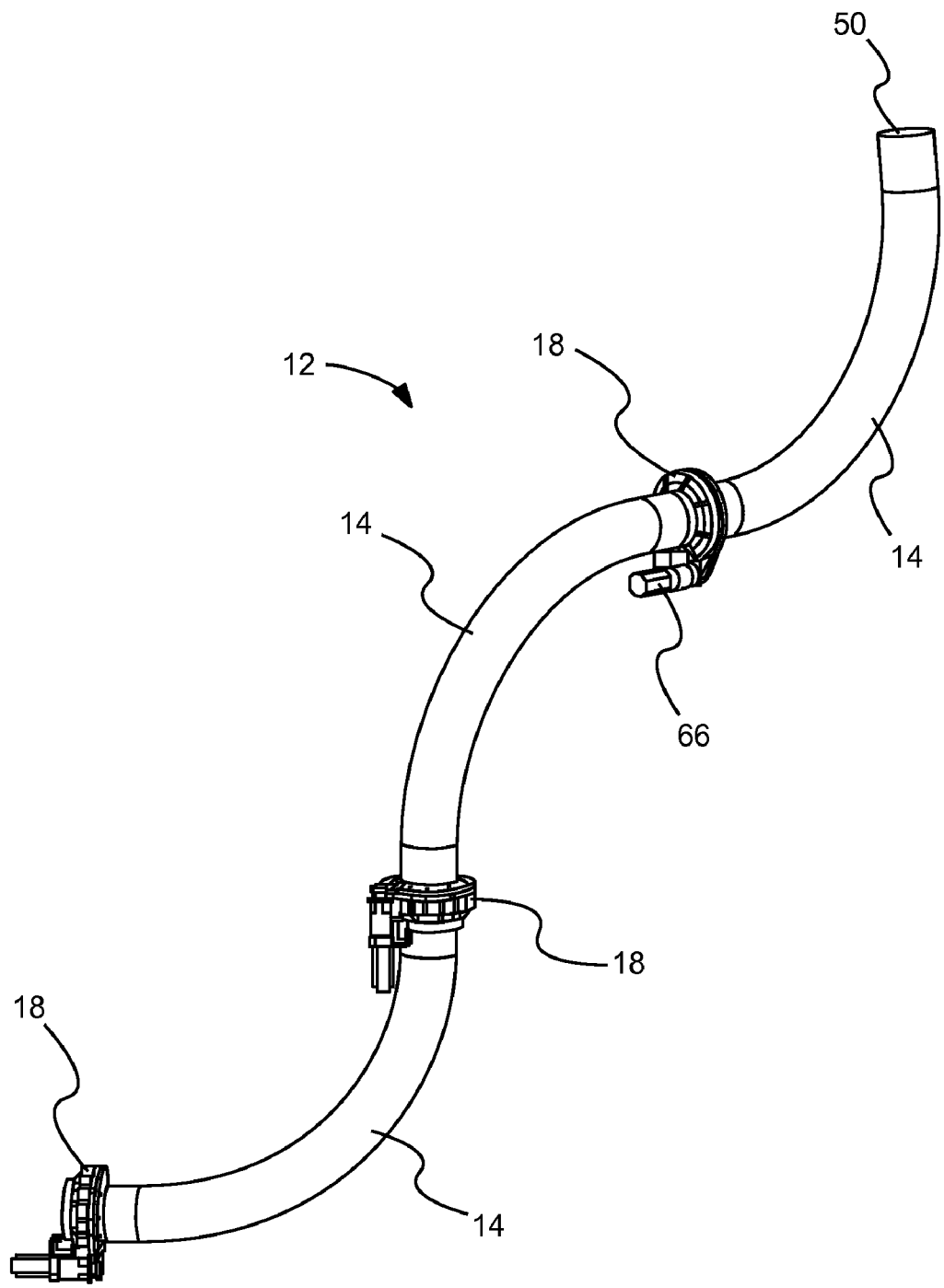
FIG. 4 is a perspective view of a jointed arm 12 of the invention.

FIG. 4 is a perspective view of a jointed arm 12 of the invention.

The arm includes several rigid tubes 14 which are joined together at two rotation assemblies 18. The two rotation assemblies 18 are under the control of computational assembly 28, which cause rotation of each of the rigid arm tubes 14 so that the distal end 50 of the jointed arm 12 is positioned adjacent to a fruit 20 to be harvested by the harvest machine 10. The tube rotator assembly 18 can take a number of forms, with one preferred form being use of stepper motors 66, as shown in FIG. 4, with a gear on one tube, and a chain going around the gear and tube. The tubes are joined by freely turning roller or other bearings.

Figure 5:
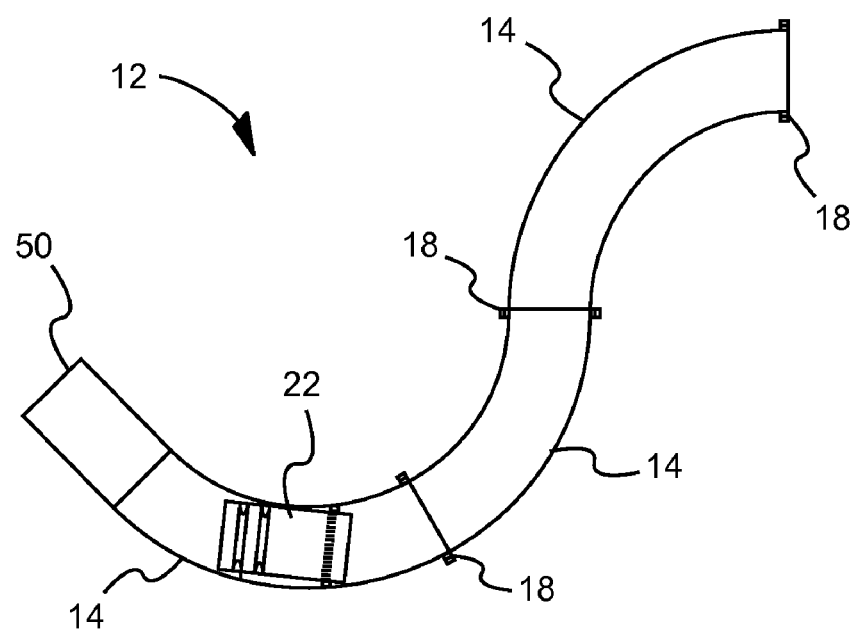
FIG. 5 is a side cut away view of an arm of the invention showing a fruit transport head inside the arm.

FIG. 5 shows a jointed arm 12 of the invention, with rigid arm tubes 14 and two rotation assemblies 18. This jointed arm 12 is attached to an arm base 30, which is attached to the harvester base unit 26. Shown in this view is a fruit transport head 22 shown in transit inside the jointed arm 12.

Figure 6:
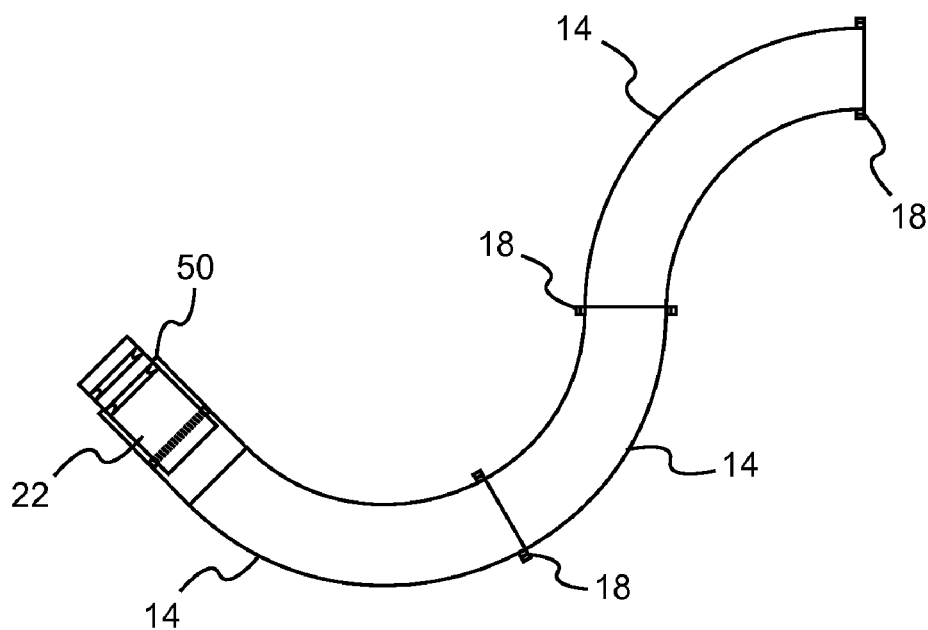
FIG. 6 is a side cut away view of a jointed arm of the invention showing the fruit harvester head positioned at the distal end of the arm in position to pick a fruit.

FIG. 6 shows the fruit transport head 22 positioned at the distal end 50 of the jointed arm 12, in position to attach to a fruit and transport it the harvesting machine 10.

Figure 7:
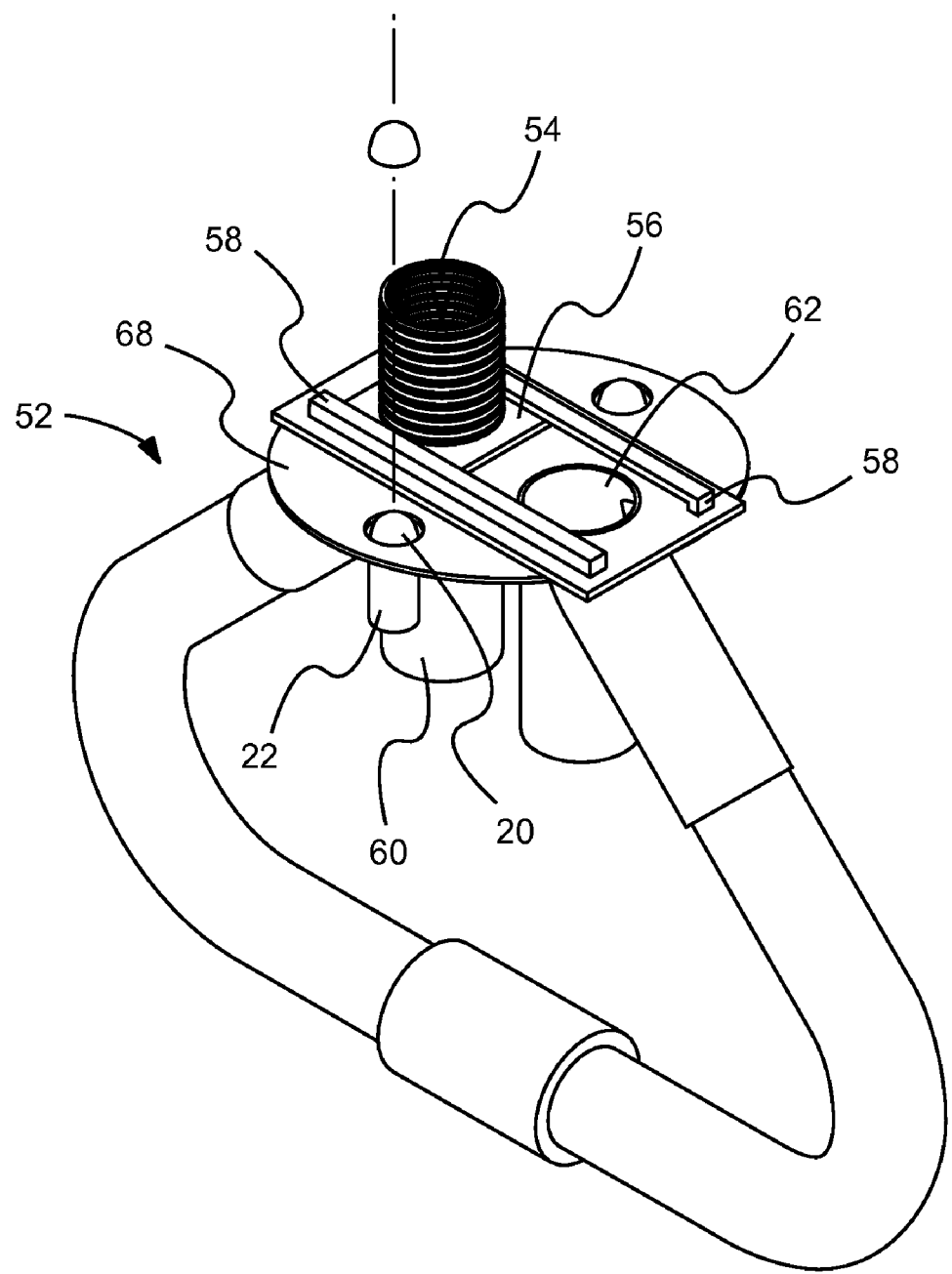
FIG. 7 is a perspective view of a version of the device for utilizing multiple fruit transport heads with an arm of the device.

FIG. 7 is a "Y" valve, which is a design that provides the ability of utilizing more than one fruit transport head 22 with each jointed arm 12 the "Y" valve 52 includes an attachment collar 54, which attaches to the jointed arm 12. The attachment collar 54 is attached at one end to a sliding plate 56, with the sliding plate 56 being enclosed by a pair of rails 58. When a fruit transport head 22 is delivered to the harvester base unit 26, it may pass through the attachment collar 54 and the fruit is released through a drop tube 60. In another configuration, the fruit transport heads can be placed in a carousel, which rotates to expose the fruit to a vacuum fruit lifter, which would extract the fruit and move it to a bin or tray based on size, color, and grade. Once the fruit transport head is in the carousel 68, the sliding plate 56 moves to the feed tube 62, and another fruit transport head 22 is directed to the distal end 50 of the arm to harvest another fruit.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. An automated fruit harvesting machine for harvesting fruit from a fruit tree, comprising:
    a harvester base unit comprising a propulsion assembly, a computational assembly, a functional connection to a fruit collection device, and a plurality of arm bases;
    a plurality of jointed arms attached to said arm bases, with each arm comprising a plurality of rigid tubes attached end to end at a plurality of joints, with each joint including a tube rotation assembly configured to rotate one tube in relation to an adjacent tube, in order to position an arm adjacent to a selected fruit;
    one or more sensors for detecting fruit to be harvested, with each said sensors configured to send fruit position information to said computational assembly in preparation for picking said fruit, with said computational assembly comprising an algorithm for directing an arm to pick a selected fruit, with said computational assembly guiding said arm into engagement with said fruit using fruit position data from said one or more sensors;
    at least one fruit transport head movably enclosed within each arm, with said fruit transport head comprising a gripping collar, with said fruit transport head configured to travel inside said tubes of said arm, from a distal end of said arm to said arm base, and to grip and retrieve without operator intervention said fruit at said distal end of said arm, with said fruit transport head configured to release said fruit at said arm base, for placement of said fruit in said fruit collection device; and a fruit stem separator for disengaging said fruit from a fruit tree.

2. The automated fruit harvesting machine of claim 1 in which said fruit collection device is a fruit storage bin.

3. The automated fruit harvesting machine of claim 1 in which said fruit transport head comprises an inflatable cuff, with said cuff configured for inflation around a fruit.

4. The automated fruit harvesting machine of claim 1 which further comprises more fruit transport heads than the number of arms.

5. The automated fruit harvesting machine of claim 1 which further comprises a plurality of fruit transport heads for each arm.

6. The automated fruit harvesting machine of claim 1, in which said rigid tubes turn in relation to each other by use of motors to reach a position adjacent to said fruit.

7. The automated fruit harvesting machine of claim 1, in which said computational assembly computes a location of a target fruit from said one or more sensors, selects an arm to pick said fruit, and computes an optimal configuration of the tubes of an arm to position the fruit transport head adjacent the target fruit.

8. The automated fruit harvesting machine of claim 6, in which said fruit transport head extends from said arm to surround said fruit, and is positioned to inflate to grip said fruit for removal from said tree.

9. The automated fruit harvesting machine of claim 7, in which said tubes of an arm move into said optimal configuration to reach the target fruit with near simultaneous positioning of said tubes.

10. The automated fruit harvesting machine of claim 1 in which said fruit stem separator is a mechanical blade in said fruit transport head.

11. The automated fruit harvesting machine of claim 1 in which said computational assembly has an option of scanning adjacent fruit trees and computing fruit positions and optimum approach paths for multiple arms of said harvester.

12. The automated fruit harvesting machine of claim 11 in which said computation assembly scans multiple fruit trees and computes fruit positions and optimum approach paths for the arms of the device to reach fruit on the adjacent quarter of the fruit trees.

13. The automated fruit harvesting machine of claim 1 in which said fruit transport head grasps said target fruit, mechanically separates the fruit from the tree, and then moves with the fruit through the inner portion of said arm to deposit said fruit in a fruit collection device.

14. The automated fruit harvesting machine of claim 13 in which said fruit transport head travels inside said arm by means of differential air pressure.

15. The automated fruit harvesting machine of claim 7 in which said fruit transport head grasps said target fruit, detaches said fruit, moves with said fruit through the inner portion of said arm, and releases said fruit into said fruit collection device.

16. The automated fruit harvesting machine of claim 1, in which said propulsion assembly is a system of wheels or tracks for propelling the harvester from one harvesting position to another.

\* \* \* \* \*